April 21, 1942.  E. H. KRUSE  2,280,759
ADJUSTABLE FISH POLE CLEAT
Filed May 31, 1940
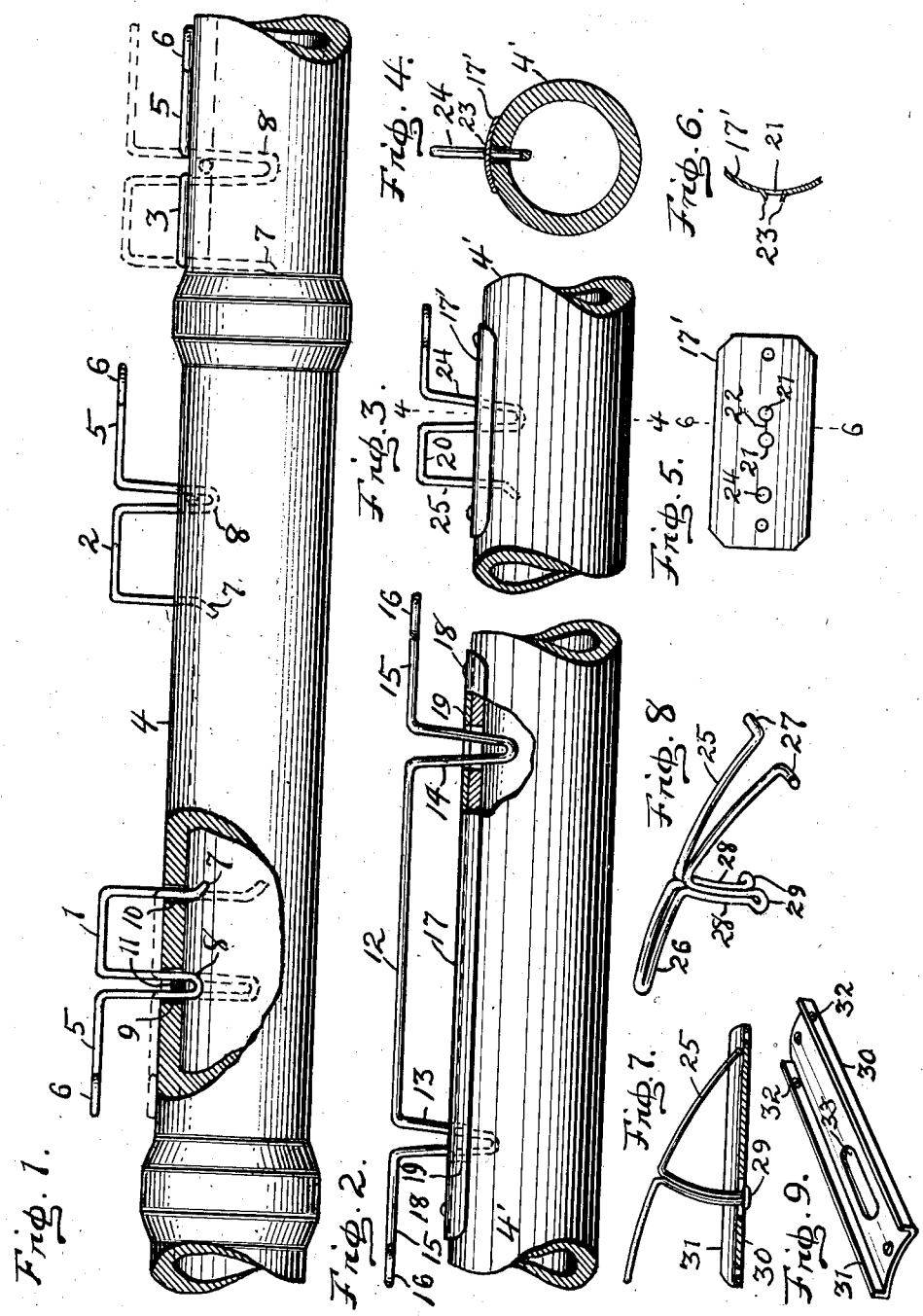
Edward H. Kruse, Incompetent INVENTOR.
BY James E. Kruse, Guardian
BY N. G. Burns ATTORNEY.

Patented Apr. 21, 1942

2,280,759

UNITED STATES PATENT OFFICE 2,280,759

ADJUSTABLE FISH POLE CLEAT

Edward H. Kruse, Fort Wayne, Ind.

Application May 31, 1940, Serial No. 338,212

4 Claims. (Cl. 43—24)

This invention relates to improvements in adjustable cleats adapted for use in connection with an ordinary cane pole especially when the pole is equipped with an eye on its tip and a series of line guides secured to the pole at spaced intervals and through which a fish line is strung in the usual manner to permit running out and drawing in of the line without entanglement for the purpose of fishing in various depths in the water.

An object of the invention is to provide on a fish pole a cleat upon which to conveniently entwine any desired amount of the fish line attached to the pole and strung through the guides and eye thereon, in order to vary the length of the free end portion of the line, and also to construct the cleat so that when not in use it is readily adjustable to an unobstructive position on the pole.

Another object of the invention is to provide an inexpensive attachment for a fish pole on which to wind a fish line that readily may be moved into or out of operating position by the simple manipulation of its parts.

And a further object of the invention is to provide cleats that are easily attachable to an ordinary cane pole in a pair or groups so spaced when in position that various lengths of the line may be taken up upon each winding as may be desired.

Other objects and advantages of the invention appear in the following description.

An illustrative embodiment of the invention is shown in the accompanying drawing, in which—

Fig. 1 is a fragmentary side view of a fish pole equipped with cleats in which the invention is incorporated;

Fig. 2 is a similar view showing a cleat of modified form and its anchor attached to a pole section, a portion being cut away;

Fig. 3 is a similar view of another modified form of the invention;

Fig. 4 is a transverse sectional view of Fig. 3 on the line 4—4 thereof;

Fig. 5 is a top plan view of an anchor plate for a cleat of the type shown in Fig. 3;

Fig. 6 is a cross-sectional view of the anchor plate shown in Fig. 5, the section being on the line 6—6 thereof;

Fig. 7 is a side view of a cleat and its anchor plate in another modified form of the invention, the anchor plate being in longitudinal section;

Fig. 8 is a perspective view of the cleat shown in Fig. 7; and

Fig. 9 is a perspective view of the anchor plate for a cleat of the type shown in Figs. 7 and 8.

The illustrative embodiment of the invention consists, as in Fig. 1, of a series of cleats 1, 2 and 3, each formed of spring wire adjustably mounted in connection with a fish pole 4, each cleat having an extending arm 5 terminating with an eye 6, its opposite end extending downwardly and terminating with an outwardly turned catch 7. Also, a downwardly extending loop 8 is formed in the wire approximately midway between the ends.

The pole has made therein a slot 9 and a corresponding opening 10, for each cleat, through which the loop 8 and the end having the catch extend and are movable therein respectively so as to permit the cleat to be adjusted toward and from the axis of the pole. A pin 11 is inserted transversely in the wall of the pole and extends through the loop of the corresponding cleat so that withdrawal of the cleat from the pole thereby is prevented. The catch 7 on the cleat also serves to limit outward adjustment of the cleat. When the cleat is pressed inwardly to the fullest extent its top including its arm 5 and its eye 6 lie flat upon the exterior surface of the pole out-of-the-way so as not to interfere with the line (not shown) attached to the pole, and permit free handling of the pole by the operator.

The slots 9 and openings 10 in the pole, and the cleats positioned therein, are so arranged that at least two of the cleats are disposed with their arms 5 extending in opposite directions, so that when the cleats are elevated to their operative positions there are thus presented opposite hooks around which the line is wound wherefore to take up more or less of the line. Preferably, the loops exert spring pressure against the opposite adjacent faces of the pins 11, or, fit with snugness against the surrounding walls of the slots through which they extend, so that the cleats are thus frictionally held into their several positions of adjustment.

When three cleats are employed, the line may be looped selectively around two adjacent cleats, or the two endmost cleats, according to the length of the line to be taken up with each operation.

In the modification of the invention, as in Fig. 2, the cleat 12 is formed of a wire shaped with two lopos 13 and 14 and oppositely extending arms 15 at each end that preferably terminate with an eye 16. In this form there is provided an anchor plate 17 that is secured upon the exterior wall of the pole 4' by means of fasteners 18, and openings 19 are made in the anchor plate and the pole through which said loops extend and have adjustable movement therein toward and from the axis of the pole. When the cleat is elevated, oppositely disposed hooks thereby are presented around which is wound the fish line (not shown), thus to take up more or less of the line as desired.

In the form of the invention shown in Figs. 3, 4, 5 and 6, the cleat 20 is similar to that shown in Fig. 1 and functions in like manner. In this instance there is provided an anchor plate 17' similar to the plate 17 shown in Fig. 2. The anchor plate has made therein a pair of openings 21 and a slit 22 in the plate connecting said openings, and the portions of the anchor plate immediately adjacent said slit form retaining lugs 23 which are initially upturned to permit the loop 24 of the cleat 20 to be inserted through the plate, and when subsequently pressed back into conformity with the contour of the anchor plate between the arms of the loop, prevent withdrawal of the cleat from the anchor plate. An opening 24 is also made in the anchor plate for reception of the rear end portion 25 of the cleat. In this instance the pole 4' is provided with openings for the reception of the inserted portions of the cleat as in the other forms of the invention.

In the modification of the invention shown in Figs. 7, 8 and 9, the cleat 25 is formed of wire shaped to have an extending arm 26 at one end and outwardly extending trunnions 27 at its opposite end, and also intermediate pendent portions 28 the lower ends of which are out-turned to form stops 29. In this instance there is provided an anchor plate 30 having side flanges 31 in which are made near their rear end openings 32 through which the trunnions 27 extend. The anchor plate has made therein an elongated opening 33 through which the stops initially are inserted preliminary to the placing of the trunnions in the openings 32 in the flanges. The opening 33 is sufficiently narrow as to prevent withdrawal of the stops through the opening 33 while the trunnions of the cleat are positioned in the flanges. In this form the cleat has pivotal movement in the anchor plate instead of sliding movement as in the former instances.

Variations from the particular construction above disclosed may readily be made by exercise of engineering skill without departure from the spirit or scope of the invention, and the following claims are intended to be inclusive of such variations.

What I claim is:

1. In a take-up appliance for a fish line, a fish pole, cleat members each formed of spring wire shaped to have at one end an extending arm provided with an eye at its extremity, its opposite end being downturned terminating with a catch, and provided with an intermediate loop, said loop and downturned end extending adjustably through a corresponding slot and an opening respectively made in said pole, and retaining pins disposed transversely in the pole engaging the corresponding loops.

2. A fish line cleat for a fish pole, said cleat consisting of members each formed of spring wire shaped to have at one end an extending arm and a downturned opposite end terminating with a catch, and having an intermediate loop, the loop and downturned end of each member being disposed adjustably through the wall of said pole for movement toward and from the axis thereof, the top of each cleat including the arm thereof being disposed flat upon the adjacent wall of the pole when pressed inward to its farthermost extent, and a pin for each member disposed in the wall of the pole and extending through the loop of the corresponding member wherefore to limit outward adjustment thereof.

3. A cleat for a fish pole formed of a wire shaped to have an extending arm at one end and a downwardly extending loop in its medial portion that extends movably through a slot made in said pole when the cleat is in position thereon, and means engageable with said loop connected with the pole wherefore to limit outward adjustment of said cleat.

4. A fish pole provided with oppositely disposed cleats in connection therewith, said cleats having limited adjustment laterally outward respecting the pole to permit coiling of a line thereon and adapted when moved inwardly to confine the coiled line against said pole.

EDWARD H. KRUSE.